(12) United States Patent
Fillatreau et al.

(10) Patent No.: US 7,523,559 B2
(45) Date of Patent: Apr. 28, 2009

(54) COMPASS HEADING NOISE IMMUNITY

(75) Inventors: Philippe Fillatreau, Toulouse (FR); Francois-Xavier Bernard, Corronsac (FR)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 11/100,910

(22) Filed: Apr. 7, 2005

(65) Prior Publication Data
US 2005/0223573 A1 Oct. 13, 2005

Related U.S. Application Data

(60) Provisional application No. 60/560,204, filed on Apr. 7, 2004.

(51) Int. Cl.
*G01C 17/38* (2006.01)

(52) U.S. Cl. .................................................. 33/356

(58) Field of Classification Search ............... 33/356, 33/357, 355 R; 73/1.76; 701/224; 702/92, 702/93
See application file for complete search history.

(56) References Cited

U.S. PATENT DOCUMENTS

| | | | | |
|---|---|---|---|---|
| 4,611,293 | A | | 9/1986 | Hatch et al. |
| 4,622,754 | A | * | 11/1986 | Chujo et al. ............... 33/356 |
| 4,672,565 | A | * | 6/1987 | Kuno et al. ................ 702/92 |
| 5,021,962 | A | * | 6/1991 | Helldorfer et al. ......... 701/224 |
| 5,046,031 | A | | 9/1991 | Wanous |
| 5,165,269 | A | * | 11/1992 | Nguyen ..................... 73/1.76 |
| 5,440,303 | A | | 8/1995 | Kinoshita ................... 340/901 |
| 5,664,335 | A | * | 9/1997 | Suman et al. .............. 33/356 |
| 5,828,984 | A | * | 10/1998 | Cage et al. ................ 702/92 |
| 6,014,610 | A | | 1/2000 | Judge et al. |
| 6,301,794 | B1 | * | 10/2001 | Parks et al. ................ 33/356 |
| 2005/0183274 | A1 | * | 8/2005 | Cho et al. .................. 33/356 |
| 2005/0188556 | A1 | * | 9/2005 | Lee et al. ................... 33/356 |
| 2007/0101596 | A1 | * | 5/2007 | Olson et al. ............... 33/356 |
| 2008/0071492 | A1 | * | 3/2008 | Skvortsov et al. .......... 702/92 |

FOREIGN PATENT DOCUMENTS

JP 08029177 A * 2/1996

* cited by examiner

*Primary Examiner*—R. A. Smith

(57) ABSTRACT

A method of controlling an electronic compass assembly includes calibrating magnetic field sensors to produce a calibration product and determining whether a magnetic interference condition exists based upon the calibration product. In one example, the calibration product includes a calibration ellipse. In another example, the method includes determining a first length of time that corresponds to a duration of a magnetic interference condition or a second length of time that corresponds to an elapsed time after the magnetic interference condition. A portion of the electronic compass is controlled based upon the first length of time or the second length of time.

16 Claims, 5 Drawing Sheets

COMPASS HEADING NOISE IMMUNITY

The application claims priority to U.S. Provisional Application No. 60/560,204, filed on Apr. 7, 2004.

BACKGROUND OF THE INVENTION

This invention relates to a compass and, more particularly, to an electronic compass assembly and method for controlling the electronic compass assembly.

Electronic compass assemblies are often used in vehicles to indicate to a driver or passenger of the vehicle a direction that the vehicle is facing or traveling. A typical electronic compass assembly includes magnetic sensors that detect the magnetic field of the Earth. A microprocessor typically then determines the direction of the vehicle from the detected magnetic field and displays the direction as one of North, South, East, West, Northeast, Northwest, Southeast, and Southwest.

The magnetic conditions of the vehicle and surrounding environment of the vehicle typically change over time. As a result, the magnetic sensors are periodically calibrated to correct the magnetic field data for these magnetic changes. Calibration typically includes collecting magnetic field data from the magnetic sensors through a 360° turn of the vehicle (or a predetermined percentage of a 360° turn). The collected magnetic field data is generally ellipse-shaped. The microprocessor utilizes a statistical fitting procedure to produce a reference correction factor (e.g., a calibration ellipse) from the collected magnetic field data. The reference correction factor is then used to correct magnetic field data points before the microprocessor determines the vehicle direction.

The accuracy of typical electronic compass assemblies is susceptible to magnetic interference, sensor noise, and other conditions that affect the magnetic field data. In particular, nearby ferrous objects such as other vehicles, train tracks, or bridges to name a few examples may cause magnetic interference. Typically, the magnetically interfering object causes a change in the magnetic field that is detected by one or more of the magnetic sensors. The change in magnetic field skews the calculation of the vehicle direction by the microprocessor. This may result in a wrong direction being displayed to the driver or passenger without the driver or passenger being aware of the inaccuracy.

Typical electronic compass assemblies attempt to detect magnetic interference by filtering the magnetic field data points that are used to determine the compass headings. These methods often include comparing a collected magnetic field data point to previous magnetic field data points. If the collected magnetic field data point deviates a predetermined amount from the previous magnetic field data points, a magnetic interference condition exists. Another method includes averaging several successive magnetic field data points and comparing a subsequently collected magnetic field data point to the average to identify a magnetic interference condition. Disadvantageously, these methods may inaccurately identify magnetic interference conditions because too few data points are used. Using only a few data points, it is difficult to distinguish what are actually momentary magnetic disturbances from longer term magnetic interference. This often results in a wrong vehicle heading being displayed.

Accordingly, there is a need for an electronic compass assembly that identifies whether a magnetic interference condition exists in order to avoid displaying a wrong direction or to warn the driver or passenger that the displayed direction is unreliable. This invention addresses those needs and provides enhanced capabilities while avoiding the shortcomings and drawbacks of the prior art.

SUMMARY OF THE INVENTION

An exemplary method of controlling an electronic compass assembly includes calibrating magnetic field sensors to produce a calibration product and determining whether a magnetic interference condition exists based upon the calibration product. In one example, the calibration product includes a calibration ellipse.

In another example, the method of controlling the electronic compass assembly includes determining a first length of time that corresponds to a duration of a magnetic interference condition or a second length of time that corresponds to an elapsed time after the magnetic interference condition. A portion of the electronic compass is controlled based upon the first length of time or the second length of time.

An electronic compass assembly includes a processor module that receives magnetic field data and produces a calibration product based upon the magnetic field data. The processor module determines whether a magnetic interference condition exists based upon the calibration product. The processor module communicates with a compass display portion and a magnetic sensor that senses a magnetic field and produces the magnetic field data. The processor module controls the compass display portion based upon the magnetic interference condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
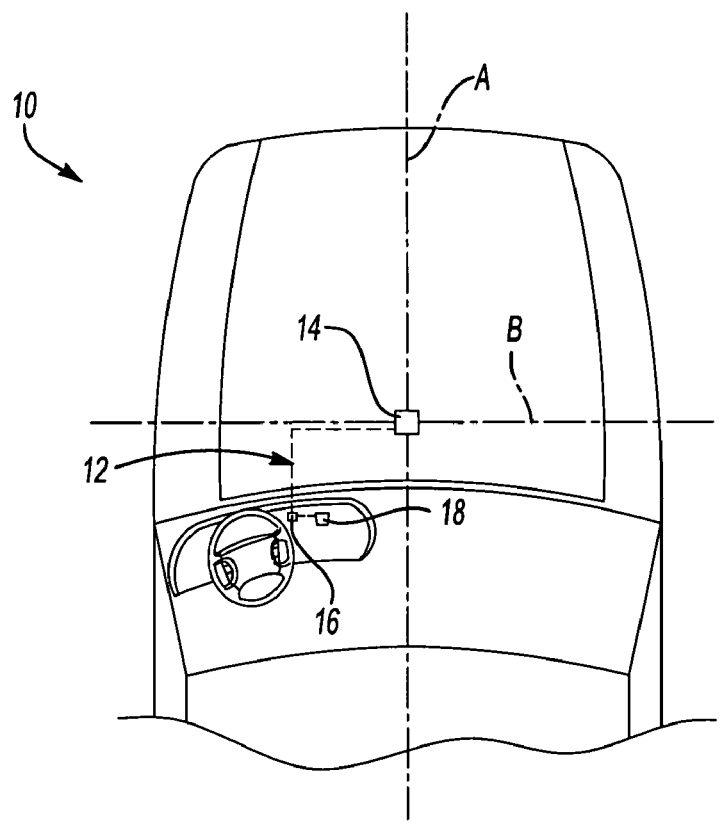
FIG. 1 shows a schematic view of an example vehicle having an electronic compass assembly for determining a direction the vehicle is facing or traveling.

FIG. 1 is a schematic view of an example vehicle 10 having an electronic compass assembly 12 for determining a direction the vehicle 10 is facing or traveling. In the example shown, the electronic compass assembly 12 includes magnetic sensors 14 that detect a magnetic field along a first longitudinal axis A and a second transverse axis B. The magnetic sensors 14 communicate an output signal representative of the magnetic field to a processor module 16 at a predetermined rate (e.g., 10 Hz). The processor module 16 receives the output signals as magnetic field data and determines whether a magnetic interference condition exists.

A vehicle direction is computed and displayed on a compass display portion 18 if no magnetic interference condition exists. If a magnetic interference condition does exist or has recently ended, the processor module 16 displays a previously determined reliable vehicle direction or an unreliable vehicle direction and a warning symbol. The warning symbol provides the benefit to a driver or passenger of the vehicle 10 of knowing when magnetic interference may be skewing the accuracy of a displayed vehicle direction.

Figure 2:
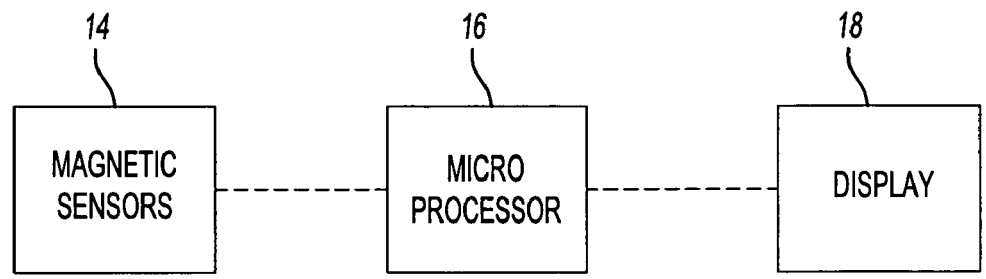
FIG. 2 shows a schematic view of an example electronic compass assembly.

FIG. 2 illustrates a schematic view of an example electronic compass assembly 12. In the example shown, the magnetic sensors 14, processor module 16, and display portion 18 are separate, however, given this description, one skilled in the art would recognize the value in combining one or more of these into a single integrated component to meet the needs of their particular situation.

Figure 3:
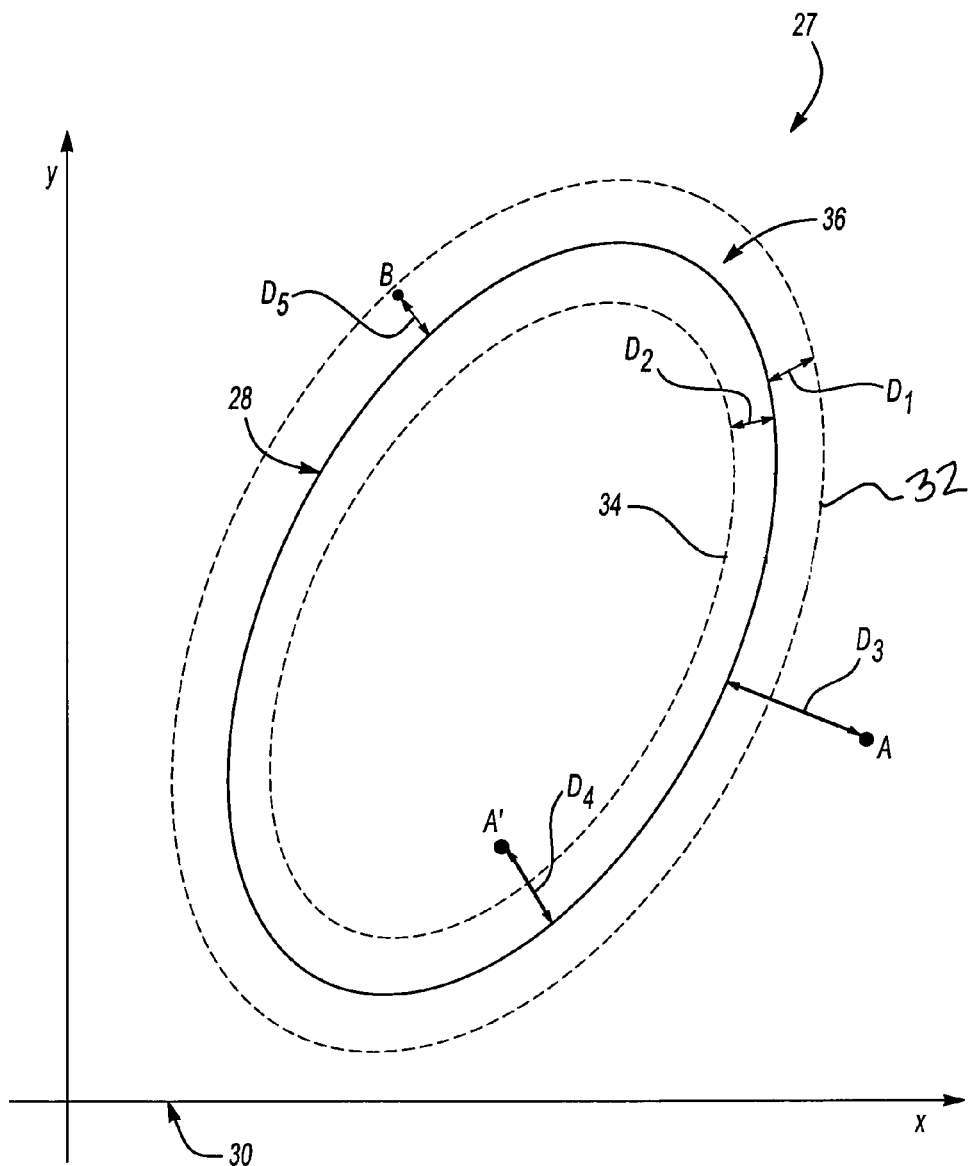
FIG. 3 shows an example method of determining whether a magnetic interference condition exists based upon a calibration ellipse.

FIG. 3 illustrates an example method of determining whether a magnetic interference condition exists based upon a calibration product 27 that is determined by the processor module 16. In the illustrated example, the calibration product 27 includes a known calibration ellipse 28 plotted on a Cartesian plane 30. The calibration ellipse 28 includes an outer tolerance 32 spaced a distance $D_1$ from the calibration ellipse 28 and an inner tolerance 34 spaced a distance $D_2$ from the calibration ellipse 28. In one example, the distances $D_1$ and $D_2$ are each based upon mathematical features of the calibration ellipse 28. In another example, the distances $D_1$ and $D_2$ are based upon a percentage of a length of the major or minor axis of the calibration ellipse 28. In the illustrated example, the outer tolerance 32 is equal to the inner tolerance 34, however, given this description, one of ordinary skill in the art will recognize that $D_1$ and $D_2$ can be adjusted to meet their particular needs.

The outer tolerance 32 and inner tolerance 34 form a tolerance band 36 around the calibration ellipse 28. Magnetic field data points that are not within the tolerance band 36 represent a magnetic interference condition. In the illustrated example, a magnetic field data point A is plotted on the Cartesian plane 30. The magnetic field data point A lies a distance $D_3$ from the calibration ellipse 28. The magnetic field data point A is outside of the calibration ellipse 28, so the distance $D_3$ is compared to $D_1$. Since the distance $D_3$ is greater than the outer tolerance 32 distance $D_1$, the processor module 16 determines that the magnetic field data point A is not within the tolerance band 36 and that the magnetic field data point A represents a magnetic interference condition.

In another example, a magnetic field data point A' lies inside of the calibration ellipse 28 a distance $D_4$ from the calibration ellipse 28. The distance $D_4$ is therefore compared to the inner tolerance 34. Since the distance $D_4$ is greater than the distance $D_2$, the processor module 16 determines that the magnetic field data point A' is not within the tolerance band 36 and that the magnetic field data point A' represents a magnetic interference condition.

In another example, a magnetic field data point B lies a distance $D_5$ from the calibration ellipse 28 and is outside of the calibration ellipse 28. The magnetic field data point B is outside of the calibration ellipse 28, so it is compared to the outer tolerance 32 distance $D_1$. Since the distance $D_5$ is less than the distance $D_1$, the processor module 16 determines that the magnetic field data point B is within the tolerance band 36 and that a magnetic interference condition does not exist.

Figure 4:
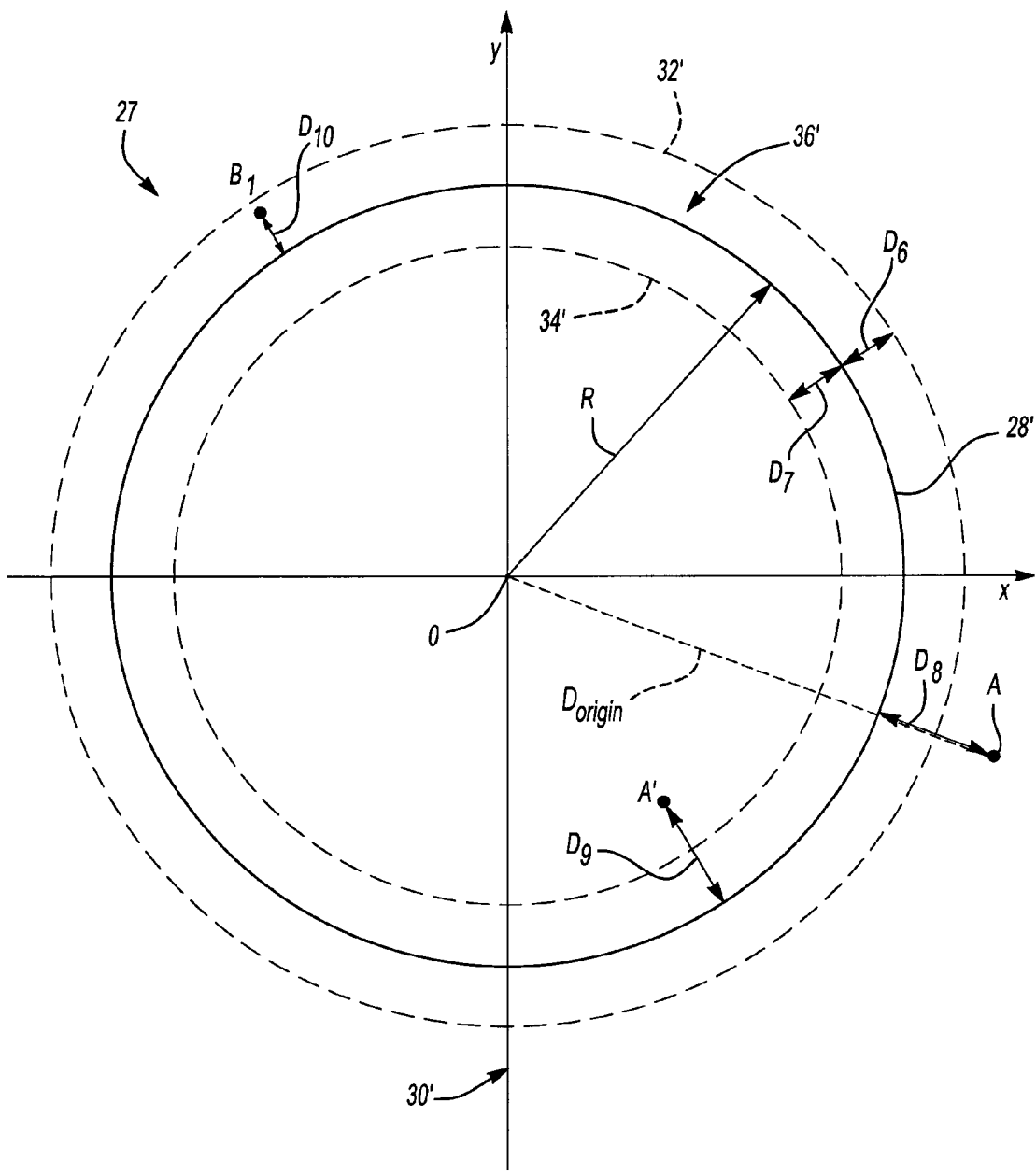
FIG. 4 shows an example method of determining whether a magnetic interference condition exists based upon a transformed calibration ellipse.

FIG. 4 illustrates another example method of determining whether a magnetic interference condition exists based upon the calibration product 27. In this example, the calibration ellipse 28 of FIG. 3 is transformed using a known circularization procedure to produce a calibration circle 28' that is centered about an origin O on a Cartesian plan 30'. The calibration circle 28' includes a circular outer tolerance 32' spaced a distance $D_6$ from the calibration circle 28' and a circular inner tolerance 34' spaced a distance $D_7$ from the calibration circle 28'. In one example, the distances $D_6$ and $D_7$ are based upon mathematical features of the calibration circle 28'. In another example, the distances $D_6$ and $D_7$ are based upon a selected percentage of the radius R of the calibration circle 28', however, given this description, one of ordinary skill in the art will recognize that $D_6$ and $D_7$ can be adjusted to meet their particular needs.

The circular outer tolerance 32' and circular inner tolerance 34' form a tolerance band 36' that extends about the circumference of the calibration circle 28'. Data points that are not within the tolerance band 36' represent a magnetic interference condition. The magnetic field data point A of the example of FIG. 3 is transformed by circularization in the same manner as the calibration ellipse 28 was to produce the calibration circle 28' and plotted on the Cartesian plane 30'. The circularized magnetic field data point A lies a distance $D_8$ from the calibration circle 28'. The circularized magnetic field data point A is outside of the calibration circle 28', so it is compared to the distance $D_6$. Since the distance $D_8$ is greater than the distance $D_6$, the processor module 16 determines that the circularized magnetic field data point A is not within the tolerance band 36' and that the magnetic field data point A therefore represents a magnetic interference condition.

In one example, the distance $D_8$ is the difference between a distance $D_{origin}$ of the circularized magnetic field data point A from the origin O in the Cartesian plane 30' and the radius R of the calibration circle 28'.

The circular reference system of the disclosed example provides the benefit of reducing the complexity of the computations required to determine the tolerance band 36' and distance between a magnetic field data point and the calibration circle 28'.

The magnetic field data point A' of the example of FIG. 3 is transformed by circularization in the same manner as the calibration ellipse 28 was to produce the calibration circle 28' and plotted on the Cartesian plane 30'. The circularized magnetic field data point A' lies a distance $D_9$ from the calibration circle 28'. The circularized magnetic field data point A' lies outside of the calibration circle 28', so it is compared to the distance $D_7$. Since the distance $D_9$ is greater than the distance $D_7$, the processor module 16 determines that the magnetic field data point A' is outside of the tolerance band 36' and that the circularized magnetic field data point A' therefore represents a magnetic interference condition.

In another example, the distance $D_9$ is the difference between the distance of the circularized magnetic field data point A' from the origin O and the radius R of the calibration circle 28'. In this example, the difference is negative, however, the processor module utilizes the absolute value of the difference to compare to the tolerance band 36'.

The magnetic field data point B of the example of FIG. 3 is transformed by circularization in the same manner as the calibration ellipse 28 was to produce the calibration circle 28' and plotted on the Cartesian plane 30'. The circularized magnetic field data point B' lies a distance $D_{10}$ from the calibration circle 28'. The circularized magnetic field data point B is outside of the calibration circle 28', so it is compared to the distance $D_6$. Since the distance $D_{10}$ is less than the distance $D_6$, the processor module 16 determines that the circularized magnetic field data point B is within the tolerance band 36' and that the circularized magnetic field data point B therefore does not represent a magnetic interference condition.

The disclosed examples provide the benefit of reliably detecting a magnetic interference condition. Previously known compass assemblies are often inaccurate because the interference condition is identified relative to easily skewed averages of magnetic field data points or detected deviations between magnetic field data points. The disclosed examples eliminate the exclusive use of such local criteria as the basis for detecting the magnetic interference condition and rely upon a more sensible feature (the calibration product).

Figure 5:
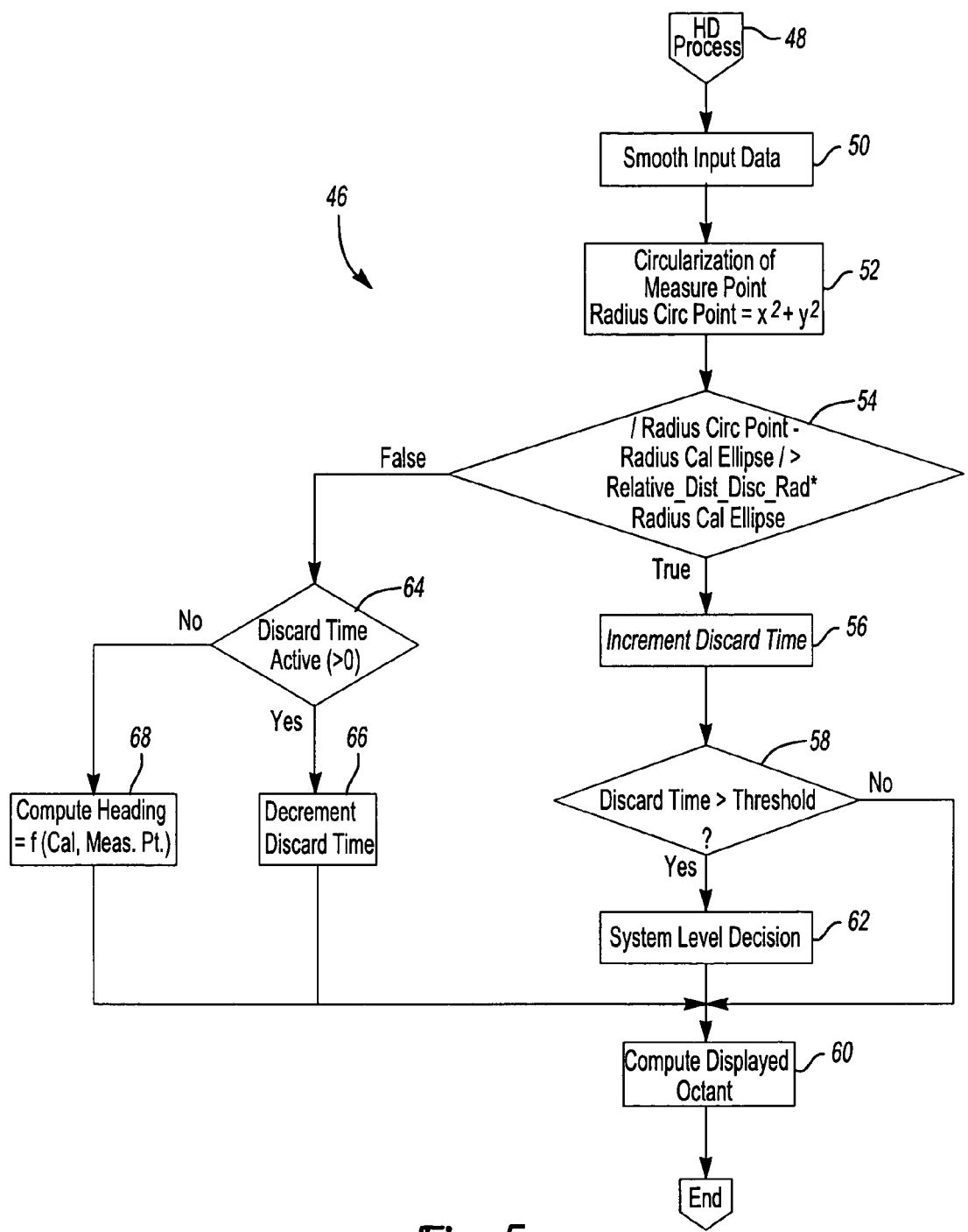
FIG. 5 illustrates an example algorithm flow chart for controlling a compass heading display based upon a magnetic interference condition.

FIG. 5 illustrates an algorithm flow chart 46 that the processor module 16 utilizes to control the electronic compass assembly 12. The processor module 16 receives a magnetic field data point from the magnetic sensors 14 at an initial step 48. The magnetic field data is smoothed at 50 using a smoothing parameter of known size, for example. In the example shown, the processor module circularizes the magnetic field data point at 52, as explained above, and compares the absolute value of the distance from the circularized magnetic field data point to the calibration circle 28' at 54. If the circularized magnetic field data point is outside the tolerance band 36', the processor module 16 determines that a magnetic interference condition exists and the algorithm proceeds to the step at 56.

At 56, the processor module 16 increases a value of a discard time counter by a predetermined increment. At 58, the value of the discard time counter is compared to a threshold. A value less than the threshold indicates that the magnetic field condition has recently begun, for example. In one example, the threshold corresponds to a selected amount of time. That is, a threshold of 100 corresponds to a time of ten seconds if the magnetic field data is produced at a predetermined rate of 10 Hz and increases the value of the discard time counter by an increment of one. In this example, when the value of the discard time counter is less than the threshold, a previously computed vehicle direction is likely still valid and is displayed (i.e. as one octant of N, S, E, W, NW, NE, SW, SE) on the compass display portion at the step 60.

In another example, the threshold is adapted to the speed of the vehicle 10. The vehicle direction is expected to change more frequently when the vehicle 10 is moving than when the vehicle 10 is not moving. In one example, a vehicle speed signal indicates that the vehicle 10 is not moving. The processor module 16 sets the threshold to a very large value because the vehicle direction is not expected to change when the vehicle 10 is not moving. In another example, the vehicle speed signal indicates that the vehicle 10 is moving. The processor module 16 sets the threshold to a smaller value because the vehicle direction is expected to change as the vehicle 10 moves (and likely changes direction).

A discard time counter value greater than the threshold at 58 indicates that the magnetic field condition has lasted longer than a selected period of time, for example. The previously computed vehicle direction is likely no longer valid and the processor module 16 makes a system level decision at 62 to display the most reliable vehicle direction available (e.g., the previously computed vehicle direction or a vehicle direction that has not been corrected to account for magnetic field changes to the surrounding vehicle environment) along with a warning symbol to warn the vehicle 10 driver or passenger that the magnetic interference condition exists, as will be described below.

Referring again to the step at 54, if the circularized magnetic field data point is inside of the tolerance band 36', the processor module 16 determines that a magnetic interference condition does not exist and the algorithm proceeds to the step at 64. At 64, the value of the discard time counter is decreased by a predetermined increment for each magnetic field data point. A previously computed vehicle direction or display from the system level decision at 62 is displayed while the value is above zero.

The size of the predetermined decrement used at 66 corresponds to a selected period of time elapsed after the magnetic interference condition exit. That is, a threshold of 100 corresponds to a time of 5 seconds if the magnetic field data is produced at a predetermined rate of 10 Hz and decreases the value of the discard time counter by an increment of two. In one example, a discard time counter value above zero indicates that the vehicle 10 has recently exited the magnetic interference condition. Although the magnetic field data points are within the tolerance band 36', the magnetic interference condition is not stable and therefore not reliable for determining and displaying accurate vehicle directions.

In another example, the discard time value of zero indicates that the vehicle 10 is not subject to a magnetic interference condition. The processor module 16 determines a compass heading at 68 and displays a vehicle direction based upon the compass heading at 60.

The disclosed examples provide the advantage of adapting the compass display portion 18 based upon a magnetic interference condition. That is, the processor module 16 not only accurately determines whether a magnetic interference condition exists but also warns the driver or passenger that the electronic compass is operating unreliably if the magnetic interference condition lasts for a selected period of time.

Figure 6A:
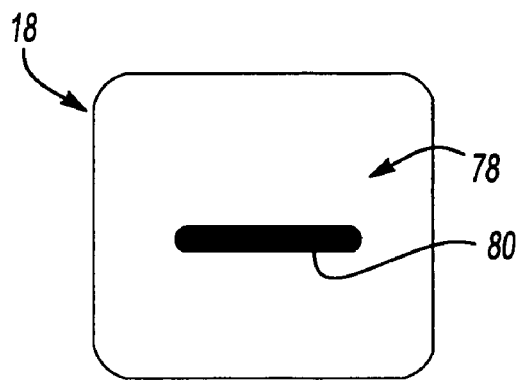
FIG. 6A illustrates a schematic view of an example warning symbol.
Figure 6B:
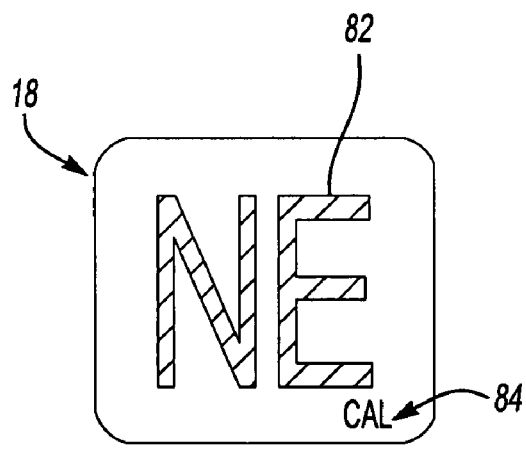
FIG. 6B illustrates a schematic view of a second example warning symbol.
Figure 6C:
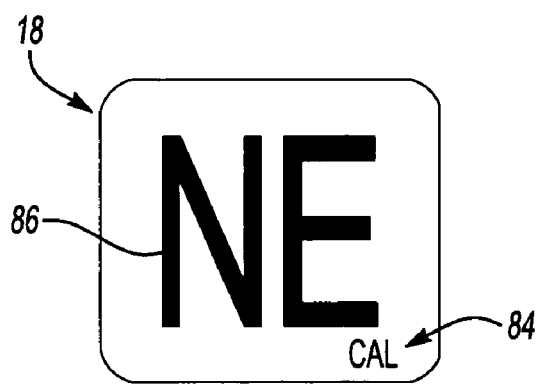
FIG. 6C illustrates a schematic view of a third example warning symbol.

FIGS. 6A-6C illustrate example warning symbols displayed by the display portion 18 as a result of the system level decision at 62 to communicate vehicle direction and magnetic interference information to a vehicle driver or passenger. The example warning symbol 78 illustrated in FIG. 6A includes a dash 80 to indicate there is no accurate vehicle direction to be displayed.

In the example illustrated in FIG. 6B, a potentially inaccurate vehicle direction 82 (i.e., there is magnetic interference) is displayed in a highlighted manner, together with a small "CAL" symbol 84 to indicate that the vehicle direction is unreliable. In one example, the processor module determines in a known manner the potentially inaccurate vehicle direction 82 based upon magnetic field data that is outside of the tolerance band 36' (or tolerance band 36 using non-circularized data). In one example, the potentially inaccurate vehicle direction 82 is a previously computed vehicle direction (i.e., a vehicle direction that has been corrected for magnetic changes to the environment surrounding the vehicle 10). In another example, the potentially inaccurate vehicle direction is one that has not been corrected for magnetic changes to the environment surrounding the vehicle 10.

In the example illustrated in FIG. 6C, the displayed vehicle direction 86 is "frozen" (i.e., displaying the last valid vehicle direction that was corrected for magnetic changes to the environment surrounding the vehicle 10) and displayed with a warning symbol, such as the small "CAL" symbol 84 to indicate that the displayed vehicle direction 86 is unreliable. Given this description, those skilled in the art will be able to select appropriate warning symbols to meet the needs of their particular situation.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling an electronic compass assembly comprising:
   calibrating at least one magnetic field sensor by collecting magnetic field data points in a computed mathematical form of an elliptical calibration product;
   circularizing the elliptical calibration product to produce a circular calibration product;
   in a compass heading process, comparing heading magnetic field data to the circular calibration product to determine whether a magnetic interference condition exists; and
   controlling a display of the vehicle direction based on whether the magnetic interference condition exists.

2. The method as recited in claim 1, including collecting the magnetic field data collected through at least a portion of a 360° rotation.

3. The method as recited in claim 1, including displaying a warning symbol if the magnetic interference condition exists.

4. The method as recited in claim 1, including determining a length of time that the magnetic interference condition exists.

5. The method as recited in claim 4, including selecting a length of time elapsed after the magnetic interference condition based upon the length of time that the magnetic interference condition exists.

6. The method as recited in claim 1, including collecting another magnetic field data point (A) to be used for determining whether the magnetic interference condition exists, and circularizing the magnetic field data point (A).

7. The method as recited in claim 6, including determining the tolerance based upon a mathematical feature of the circular calibration product.

8. The method as recited in claim 6, including determining a distance between the magnetic field data point (A) and the circular calibration product, and comparing the distance to a tolerance of the circular calibration product to determine whether the magnetic interference condition exists.

9. The method as recited in claim 1, wherein controlling the displayed vehicle direction includes displaying the vehicle direction based on the heading magnetic field data if a magnetic interference condition does not exist or indicating to a user that the displayed vehicle direction is unreliable if the magnetic interference condition exists.

10. An electronic compass assembly comprising:
    a processor module that determines a compass heading and displays a vehicle direction based upon the compass heading, the processor module receiving magnetic field data in a computed mathematical form of an elliptical calibration product based upon the magnetic field data, the processor module circularizing the elliptical calibration product to produce a circular calibration product and determining whether to display the vehicle direction based upon whether a magnetic interference condition exists.

11. The assembly as recited in claim 10, including a compass display portion in communication with the processor module, the processor module controlling the compass display portion based upon the magnetic interference condition.

12. The device as recited in claim 11, wherein the processor module commands the compass display to display a warning symbol if the magnetic interference condition exists.

13. The assembly as recited in claim 10, including at least one magnetic sensor in communication with the processor module, the at least one magnetic sensor sensing a magnetic field and producing the magnetic field data.

14. The assembly as recited in claim 10, wherein the processor module compares at least a portion of the magnetic field data to the circular calibration product to determine whether a magnetic interference condition exists.

15. The assembly as recited in claim 10, wherein the processor module determines at least one of a first length of time corresponding to a duration of the magnetic interference condition or a second length of time corresponding to an elapsed time since the magnetic interference condition.

16. The assembly as recited in claim 15, wherein the processor module controls a compass display portion based upon at least one of the first length of time or the second length of time.

* * * * *